(12) United States Patent
Shapiro (10) Patent No.: US 10,592,700 B2
(45) Date of Patent: Mar. 17, 2020

(54) SECURING ELECTRONIC PROPERTY FROM UNAUTHORIZED USE

(71) Applicant: ADT US HOLDINGS, INC., Boca Raton, FL (US)

(72) Inventor: Steven Shapiro, Lake Worth, FL (US)

(73) Assignee: The ADT Security Corporation, Boca Raton, FL (US)

( * ) Notice: Subject to any disclaimer, the term of this patent is extended or adjusted under 35 U.S.C. 154(b) by 248 days.

(21) Appl. No.: 14/992,613

(22) Filed: Jan. 11, 2016

(65) Prior Publication Data

US 2017/0200025 A1 Jul. 13, 2017

(51) Int. Cl.
*H04L 9/00* (2006.01)
*G06F 21/88* (2013.01)
*G06F 21/62* (2013.01)

(52) U.S. Cl.
CPC ............ *G06F 21/88* (2013.01); *G06F 21/629* (2013.01); *G06F 2221/2111* (2013.01); *G06F 2221/2143* (2013.01)

(58) Field of Classification Search
CPC ....................................................... G06F 21/88
USPC .......................................................... 726/35
See application file for complete search history.

(56) References Cited

U.S. PATENT DOCUMENTS

| | | | |
|---|---|---|---|
| 6,317,028 B1 * | 11/2001 | Valiulis | G08B 13/1418 340/10.1 |
| 6,643,781 B1 | 11/2003 | Merriam | |
| 6,725,379 B1 | 4/2004 | Dailey | |
| 7,446,655 B2 | 11/2008 | Jha et al. | |
| 8,094,037 B2 | 1/2012 | Unger | |
| 8,427,305 B2 | 4/2013 | Madsen et al. | |
| 8,669,870 B2 | 3/2014 | Jung et al. | |
| 9,136,957 B1 * | 9/2015 | Napolitano | H04H 20/38 |
| 9,413,827 B2 * | 8/2016 | Sharma | H04L 67/12 |
| 9,747,097 B2 * | 8/2017 | Peluso | G06F 8/65 |
| 2008/0238608 A1 | 10/2008 | Goldstein | |
| 2008/0293397 A1 * | 11/2008 | Gajdos | H04L 63/08 455/420 |
| 2010/0064046 A1 | 3/2010 | Jung et al. | |
| 2010/0216429 A1 * | 8/2010 | Mahajan | G06F 21/6245 455/411 |
| 2010/0229220 A1 | 9/2010 | Tsai | |

(Continued)

*Primary Examiner* — Christopher J Brown
(74) *Attorney, Agent, or Firm* — Christopher & Weisberg, P.A.

(57) ABSTRACT

An apparatus is provided. The apparatus includes processing circuitry including a processor and a memory that contains instructions that, when executed by the processor, configure the processor to receive an activation request including identification data from a device, determine whether functionality of the device is authorized for activation based on the identification data, and in response to determining the device is not authorized for activation, cause transmission of a message configured to cause functionality of the device to remain deactivated while keeping communication capability of the device activated. The memory containing instructions that, when executed by the processor, configure the processor to, in response to determining the device is authorized for activation, one of (a) cause transmission of a message configured to cause functionality of the device to activate and (b) prevent transmission of a message, the prevention indicating whether activation of functionality of the device is authorized.

19 Claims, 5 Drawing Sheets

(56) References Cited

U.S. PATENT DOCUMENTS

| | | | | |
|---|---|---|---|---|
| 2016/0150350 A1* | 5/2016 | Ingale | ............... | H04W 4/70 |
| | | | | 370/255 |
| 2016/0157100 A1* | 6/2016 | Soderblom | ........... | H04L 9/3226 |
| | | | | 455/411 |
| 2016/0182528 A1* | 6/2016 | Entezari | ............... | H04L 63/107 |
| | | | | 726/30 |

* cited by examiner

SECURING ELECTRONIC PROPERTY FROM UNAUTHORIZED USE

CROSS-REFERENCE TO RELATED APPLICATION n/a

STATEMENT REGARDING FEDERALLY SPONSORED RESEARCH OR DEVELOPMENT n/a

TECHNICAL FIELD

The present invention relates to a system, apparatus, device and method for managing operation of a device, and in particular to managing activation and deactivation of functionality of the device.

BACKGROUND

As functionality of electronic devices has continued to increase and, in some cases, as electronic devices have been conveniently reduced in size, the popularity of these devices has continued to grow. Examples of such electronic devices include mobile phones, laptops, home appliances, televisions, personal computers, stereos and tablets, among other electronic devices. However, these electronic devices remain susceptible to theft and unauthorized use. There are times when electronic devices are stolen in which there is little way to identify the stolen device aside from a serial number on the device. Further, there are few processes to prevent unauthorized use of a stolen device. For example, assume that a flat screen television is stolen from a home that did not have a security system in place at the home. The flat screen television is subsequently installed at the thief's home for use and enjoyment by the thief. There is little the manufacturer and owner of the flat screen television can do in a situation like this.

Further, expensive home appliances such as refrigerators, dishwashers, microwave ovens and stoves are often stolen from warehouses, homes under construction and retail stores. Similar to the flat screen television example, these home appliances are able to be used by anyone that comes into possession of these home appliances including the thief. While some solutions to the problem of theft and theft deterrence of electronic devices include implementing password protection at the device, these solutions do not work with certain devices such as some home appliances. After all, who wants to have to input a password to use a stove or refrigerator? Further, the electronic devices that include password protection can often times be reset by the thief, thereby resetting the password and allowing the thief to use the stolen device.

Another solution for theft and theft deterrence for home appliances is to wire or wirelessly connect the home appliance to an alarm system at the premises. In this solution, when an alarm condition is sensed such as due to a break-in, the alarm system will automatically send a coded signal to the home appliance to disable the appliance. The alarm system can also send another coded signal to the home appliance to re-enable the appliance. However, requiring an alarm system to communicate and monitor the appliance disadvantageously limits the usefulness of this solution, and adds to the complexity of the system.

SUMMARY

The present invention advantageously provides a system, apparatus and method for managing activation and deactivation of functionality of a device.

According to one embodiment of the invention, an apparatus for controlling activation and deactivation of functionality of a device is provided. The apparatus includes processing circuitry that includes a memory and a processor. The memory contains instructions that, when executed by the processor, configure the processor to receive an activation request from a device, the activation request including identification data of the device, determine whether functionality of the device is authorized for activation based on the identification data, and in response to determining the device is not authorized for activation, cause transmission of a message, to the device, the message configured to cause functionality of the device to remain deactivated while keeping communication capability of the device activated. The memory containing further instructions that, when executed by the processor, configure the processor to, in response to determining the device is authorized for activation, one of (a) cause transmission of a message, to the device, the message configured to cause functionality of the device to activate and (b) prevent a transmission of a message, to the device, the prevention indicating whether activation of functionality of the device is authorized.

According to one embodiment of this aspect, the message configured to cause functionality of the device to remain deactivated further enables the device to power up and power down, display a plurality of predefined message and transmit at least one message with a final destination address of the apparatus. According to another embodiment of this aspect, the memory contains further instructions that, when executed by the processor, cause the processor to notify authority of the received activation request if functionality of the device is not authorized for activation.

According to another embodiment of this aspect, the memory stores a plurality of identifiers and a plurality of indicators. Each identifier corresponds to a respective device and each indicator indicates whether functionality of a respective device has been flagged for deactivation. The memory contains further instructions that, when executed by the processor, cause the processor to receive a message indicating functionality of the device has been flagged for deactivation in which the message indicates an identifier associated with the device, and in response to receiving the message indicating functionality of the device has been flagged for deactivation, update the indicator associated with the device to indicate functionality of the device has been flagged for deactivation. The determination that functionality of the device is not authorized for activation is based on the indicator associated with the device.

According to another embodiment of this aspect, the memory stores further instructions that, when executed by the processor, configured the processor to, in response to determining the device is not authorized for deactivation, determine a location of the device. According to another embodiment of this aspect, the determination of the location of the device includes at least one of determining the location based on a device location received from the device and determining the location based on an internet protocol address associated with the message received from the device.

According to another embodiment of this aspect, the memory stores a plurality of identifiers and a plurality of indicators. Each identifier corresponds to a respective device and each indicator indicating whether functionality of the device has been flagged for deactivation. The determination whether functionality of a respective device is authorized for activation includes searching the plurality of identifiers stored in memory for an identifier corresponding to the identification data. If an identifier corresponds to the identification data is not found in memory, determining functionality of the device is authorized for activation. According to another embodiment of this aspect, the identification data includes at least one of a MAC identifier of the device and serial number associated with the device. According to another embodiment of this aspect, the plurality of identifiers are updatable by at least one of a consumer, manufacturer and vendor.

According to another embodiment of the invention, a method for controlling activation and deactivation of functionality of a device is provided. An activation request is received from a device. The activation request includes identification data of the device. A determination is made whether functionality of the device is authorized for activation based on the identification data. In response to determining the device is not authorized for activation, a message configured to cause predefined functionality of the device to remain deactivated while keeping communication capability of the device activated is transmitted to the device. In response to determining the device is authorized for activation, one of (a) causing transmission, to the device, of a message configured to cause functionality of the device to activate and (b) preventing transmission of a message to a device, the prevention indicating whether activation of functionality of the device is authorized.

According to another embodiment of this aspect, the message configured to cause functionality of the device to remain deactivated further enables the device to power up and power down, display a plurality of predefined message and only transmit at least one message with a final destination address of the apparatus. According to another embodiment of this aspect, a plurality of identifiers and a plurality of indicators are stored. Each identifier corresponds to a respective device and each indicator indicates whether functionality of a respective device has been flagged for deactivation. A message indicating functionality of the device has been flagged for deactivation is received. The message indicating an identifier associated with the device. In response to receiving the message indicating functionality of the device has been flagged for deactivation, update the indicator associated with the device to indicate functionality of the device has been flagged for deactivation. The determination that functionality of the device is not authorized for activation is based on the indicator associated with the device.

According to another embodiment of this aspect, in response to determining functionality of the device is not authorized for deactivation, determine a location of the device. According to another embodiment of this aspect, authority is notified of the received activation request if functionality of the device is not authorized for activation. According to another embodiment of this aspect, the determination of the location of the device includes at least one of determining the location based on a device location received from the device and determining the location based on an internet protocol address associated with the message received from the device.

According to another embodiment of this aspect, a plurality of identifiers and a plurality of indicators are stored. Each identifier corresponds to a respective device and each indicator indicates whether functionality of the device has been flagged for deactivation. The determination whether functionality of a respective device is authorized for activation includes searching the plurality of identifiers stored in memory for an identifier corresponding to the identification data. If an identifier corresponds to the identification data is not found in memory, a determination is made that functionality of the device is authorized for activation. According to another embodiment of this aspect, the identification data includes at least one of a MAC identifier of the device and serial number associated with the device. According to another embodiment of this aspect, the plurality of identifiers are updatable by at least one of a consumer, manufacturer and vendor.

According to another embodiment of the invention, an apparatus for controlling activation and deactivation of functionality of a device is provided. The apparatus includes processing circuitry that includes a processor and a memory. The memory is configured to store a plurality of identifiers and a plurality of indicators. Each identifier corresponds to a respective device. Each indicator indicates whether functionality of a respective device has been flagged for deactivation. The memory contains instructions that, when executed by the processor, configure the processor to receive an activation request from a device, the activation request including identification data of the device, determine whether functionality of the device is authorized for activation based on the indicator associated with the identification data, and in response to determining functionality of the device is not authorized for activation, cause transmission of a first message to the device, the first message configured to cause functionality of the device to remain deactivated while keeping communication capability of the device activated and notify authority of the received activation request. In response to determining functionality of the device is authorized for activation, one of (a) cause transmission of a second message to the device, the second message configured to cause activation of functionality of the device and (b) prevent a transmission of the second message to the device, the prevention indicating whether activation of functionality of the device is authorized.

The memory contains further instructions that, when executed by the processor, configure the processor to receive a message indicating functionality of the device has been flagged for deactivation, the message indicating an identifier associated with the device, and in response to receiving the message indicating functionality of the device has been flagged for deactivation, update the indicator associated with the device to indicate functionality of the device has been flagged for deactivation.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Before describing in detail exemplary embodiments that are in accordance with the invention, it is noted that the embodiments reside primarily in combinations of device/apparatus components and processing steps related to managing activation and deactivation of functionality of a device. Accordingly, components have been represented where appropriate by conventional symbols in the drawings, showing only those specific details that are pertinent to understanding the embodiments of the invention so as not to obscure the invention with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and would not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The present invention advantageously discourages the illegal acquisition of electronic property by managing the activation and deactivation of functionality of one or more devices. The devices may be configured to access and use limited device functionality such as communication functionality and input functionality for inputting communication/network information if the device is deactivated, thereby rendering the device useless for all purposes except for activating the device. Further, the devices may advantageously request reactivation after initial activation in order to prevent unauthorized use of the device if the device is subsequently lost or stolen.

Figure 1:
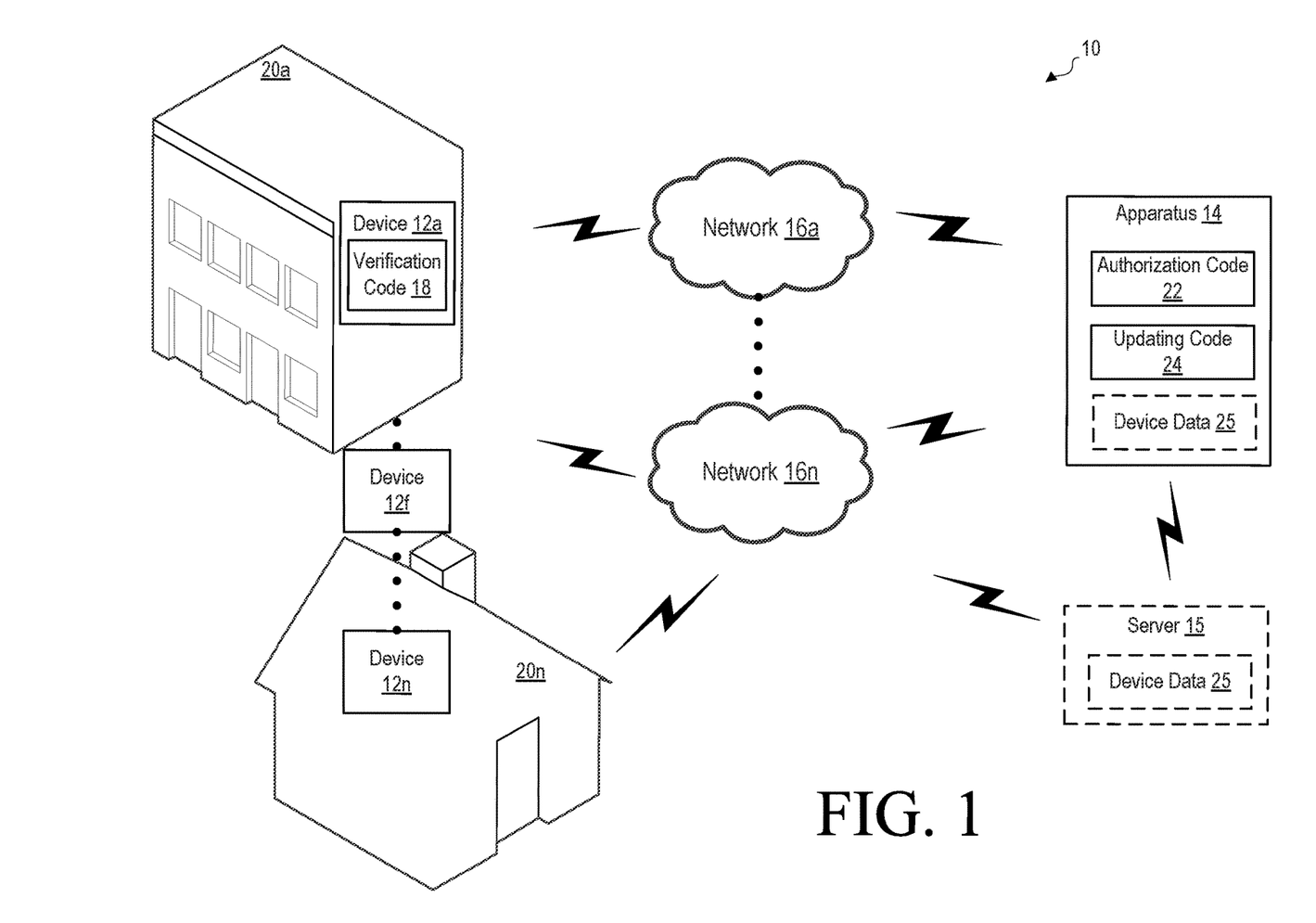
FIG. 1 is a block diagram of an exemplary system for activating and deactivating functionality of a device in accordance with the principles of the invention.

Referring now to drawing figures in which like reference designators refer to like elements there is shown in FIG. 1 an exemplary system for managing activation and deactivation of functionality of one or more devices in accordance with the principles of the present disclosure and designated generally as "10." Before describing embodiments of the activation/deactivation management process, components and other processes of system 10 will be described in detail with reference to FIG. 1 to provide a general understanding of system 10. An exemplary embodiment of system 10 for managing the activation and deactivation of functionality of one or more devices is illustrated in FIG. 1. System 10 includes one or more devices 12*a*-12*n* (collectively referred to as device 12), one or more apparatuses 14, one or more servers 15 and one or more communication networks 16*a*-16*n* (collectively referred to as network 16). Device 12 includes verification code 18 for performing the verification process for requesting activation of device 12 functionality, as described in detail with respect to FIG. 4. Device 12 may include mobile devices, laptops, personal computer, televisions, clothes washer/dryer, refrigerator, dishwashers, microwave ovens, stoves, tablet computer and computer monitor, smart appliance, video game console, other network access equipped electronic device, automobile controller, storage container, among other electronic devices and appliances that have communication and processing capabilities as described herein. In one or more embodiments, device 12 may be located in one or more premises 20*a*-20*n* (collectively referred to as premises 20) such as a home, business, warehouse, retail store and/or building.

In one or more embodiments, apparatus 14 may be one or more servers located in one or more locations such as premises 20, businesses, etc. Apparatus 14 includes authorization code 22 for performing the authorization process described in detail with respect to FIG. 5 that determines whether to activate functionality of device 12. Apparatus 14 includes updating code 24 for performing the updating process that updates device data 25 as described in detail with respect to FIG. 6. Device data 25 may include data such as identification data of one or more devices 12 as discussed below, as well as a respective indicator for each device 12. The indicator is configured to indicate whether respective device 12 has been flagged for activation of device 12 functionality or deactivation of device 12 functionality. In one or more embodiments, apparatus 14 communicates with device 12 via network 16. Network 16 may be a communication network such as an Internet Protocol based network, wide area network, local area network, among other network known in the art. Network 16 may provide various data related services and the like to device 12 and apparatus 14. In one or more embodiments, server 15 stores device data 25 described above with respect to apparatus 14. In one or more embodiments, server 15 provides device data 25 to one or more elements of system 10 such that apparatus 14 is not required to store device data 25 for future retrieval and updating. In this embodiment, apparatus 14 requests device data 25 from server 15. Server 15 can be co-located with apparatus 14 or can be located at a location remote from apparatus 14.

Figure 2:
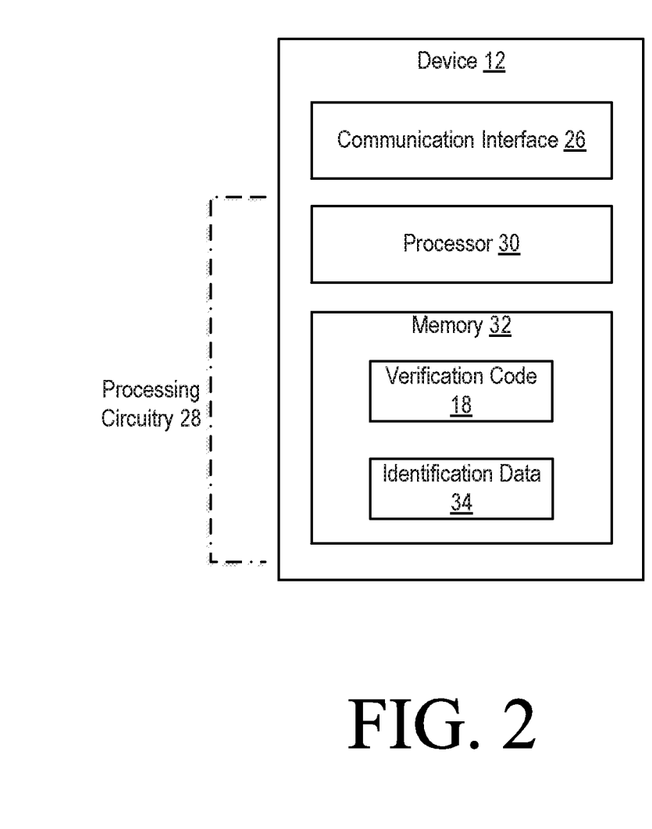
FIG. 2 is a block diagram of an exemplary device in accordance with the principles of the invention.

An exemplary block diagram of device 12 is described with reference to FIG. 2. Device 12 includes communication interface 26 for communicating with apparatus 14. In one or more embodiments, communication interface 26 communicates with apparatus 14 via network 16 using one or more communication protocols known in the art. In one or more embodiments, communication interface 26 includes one or more transmitters for transmitting data/signals and one or more receivers for receiving data/signals.

Device 12 includes processing circuitry 28 for performing device 12 functions described herein. In one or more embodiments, processing circuitry 28 is an application specific integrated circuitry (ASIC) or may be a processor 30 and memory 32, where the processor 30 operates according to executable instructions/code stored in memory 32. In other words, memory 32 contains instructions which, when executed, configure processor 30 to perform the one or more functions described herein, include those described with respect to FIG. 4.

Memory 32 is configured to store code such as verification code 18. For example, verification code 18 includes instructions, which when executed by processor 30, causes processor 30 to perform the verification process for activating or deactivating device 12 functionality, discussed in detail with respect to FIG. 4. Memory 32 is further configured to store identification data 34. In one or more embodiment, identification data 34 includes at least one of a media access control (MAC) identifier of device 12, serial number associated with device 12, IP address, location data, service set identifier (SSID) and/or password used to connect to network 16 such as a Wi-Fi network, firmware version and other data associated with device 12. In one or more embodiment, if device 12 is registered with apparatus 14, identification data 34 may include a user identification and password.

Memory 32 may include non-volatile and/or volatile memory. For example, non-volatile memory may include a hard drive, flash memory, programmable integrated circuits, memory stick, solid state memory and the like. Also, volatile memory may include random access memory and others known in the art. In one or more embodiments, memory 32 is any suitable tangle computer readable medium that may be utilized including hard disks, CD-ROMs, electronic storage devices, optical storage devices, or magnetic storage devices.

Figure 3:
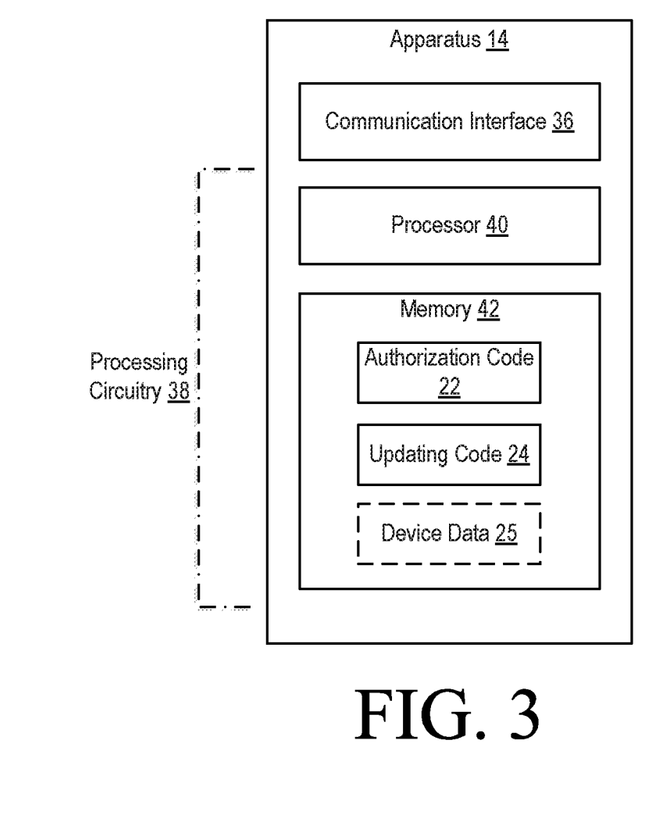
FIG. 3 is a block diagram of an exemplary apparatus for managing activation and deactivation of functionality of the device.

An exemplary block diagram of apparatus 14 is described with reference to FIG. 3. Apparatus 14 includes communication interface 36 for communicating with device 12. In one or more embodiments, communication interface 36 communicates with device 12 via network 16 using one or more communication protocols known in the art. In one or more embodiments, communication interface 36 includes one or more transmitters for transmitting data/signals and one or more receivers for receiving data/signals. Apparatus 14 includes apparatus processing circuitry 38 for performing apparatus 14 functions. In one or more embodiments, apparatus processing circuitry 38 is an ASIC or may be a processor 40 and memory 42, where processor 40 operates according to executable instructions/code which, when executed configure processor 40 to perform the one or more functions described in FIGS. 5 and 6. Processor 40 corresponds to processor 28 but with size and performance being adjusted based on design need.

Memory 42 is configured to store code such as authorization code 22 and updating code 24. For example, authorization code 22 includes instructions, which when executed by processor 40, causes processor 40 to perform a verification process that determines whether device 12 is authorized for activation or deactivation of device 12 functionality, discussed in detail with respect to FIG. 5. In another example, updating code 24 includes instructions, which when executed by processor 40, causes processor 40 to perform the updating process, discussed in detail with respect to FIG. 6. The updating process advantageously allows for dynamic updating of device data 25 such that a user, manufacturer, business owner, etc. can flag or report device 12 as stolen, lost, etc., thereby flagging device 12 for deactivation. In one or more embodiments, memory 42 is configured to store device data 25 that associated with one or more devices 12. Memory 42 may correspond to memory 32 but with size and performance being adjusted based on design need.

Figure 4:
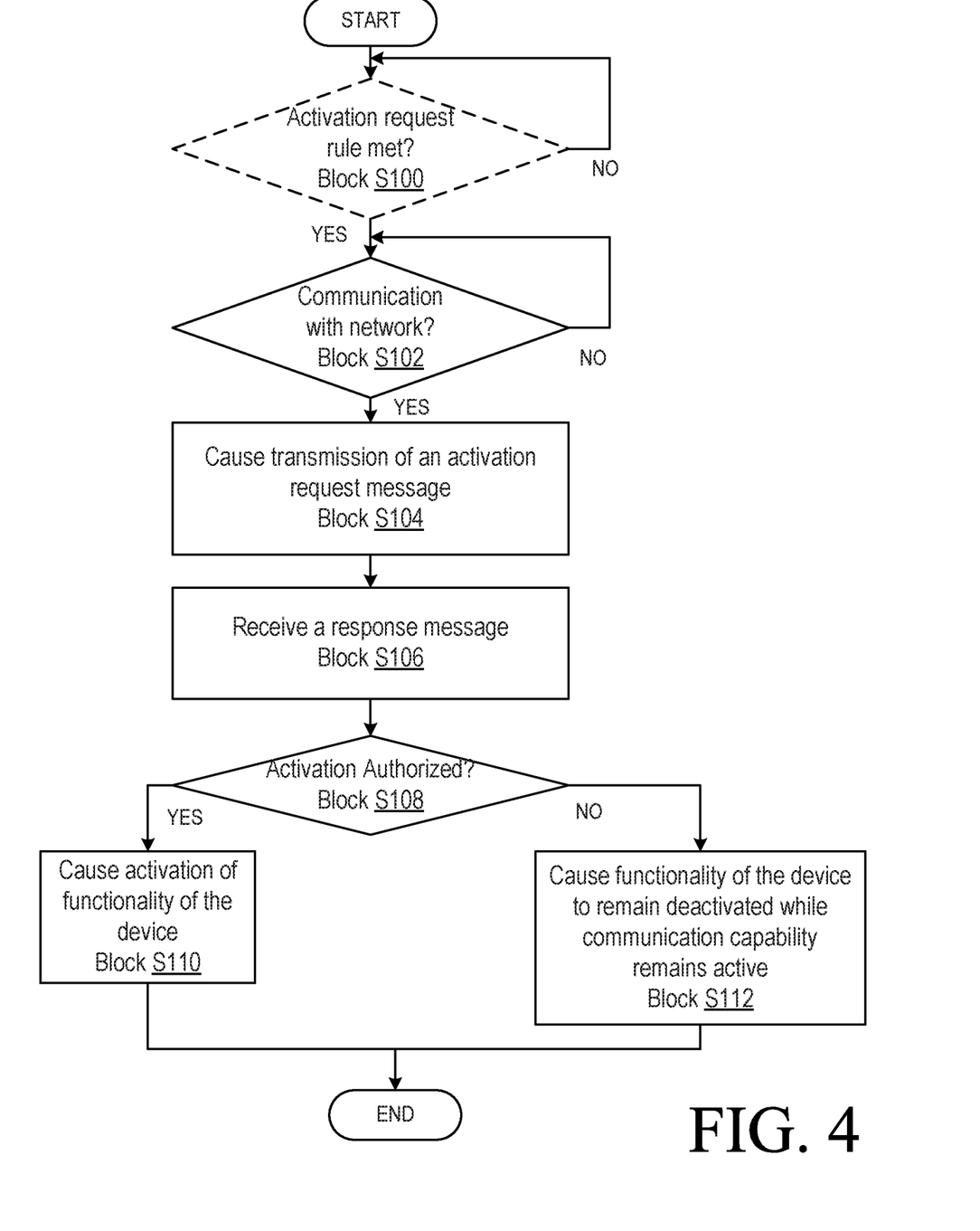
FIG. 4 is a flow diagram of an exemplary verification process for requesting activation of device functionality in accordance with the principles of the invention.

A verification process for verifying a status of device 12 for activation or deactivation of device 12 functionality in accordance with the principles of the invention is described with reference to FIG. 4. It is assumed that at Block S100, device 12 is deactivated but communication interface 26 is active or working. In other words, device functionality other than communication functionality is deactivated, but communication capability remains active to allow device 12 to communicate with other network elements, such as to report activation status, location, theft, etc., but not be active for use by a user. In other words, device 12 is rendered practically useless, from a consumer/customer perspective, when device 12 is deactivated even though communication interface 26, in one or more embodiments, may be active or working.

Device processing circuitry 28 determines whether at least one activation request rule is met (Block S100). An activation request rule includes at least one predefined factor for determining whether to trigger an activation request message for activating/deactivating device 12 functionality. In one or more embodiments, the at least one predefined factor includes at least one of distance, power, change in device 12 setting, change in IP or network address, predefined check-in schedule, or other device characteristics that is determinable by device processing circuitry 28. For example, distance may be a predefined factor in which an activation request rule is met if device 12 has been moved or is located outside a predefined distance from a predefined location such as the location where initial activation took place. In another example, the predefined factor may include one or more temporal factors such that at least one activation request rule is periodically met such as on a day/weekly/monthly/yearly basis. One or more activation request rule may be stored in memory 32. If device processing circuitry 28 determines at least one activation request rule has not been met, device processing circuitry 28 repeats the determination of Block S100. In one or more embodiments, if device processing circuitry 28 determines at least one activation request rule has not been met, device 12 remains in its current state, i.e., remains activated or remains deactivated with its communication interface 26 active or working.

If device processing circuitry 28 determines at least one activation request rule has been met, device processing circuitry 28 determines whether device 12 is in communication with network 16 (Block S102). For example, device processing circuitry 28 determines whether communication interface 26 is communicating with network 16 or is connected to network 16. In one or more embodiments, input and display functions of device 12 may be active but limited to input of network information for logging into network 16 such as a network identifier, service set identifier (SSID) and/or passcode. If device processing circuitry 28 determines device 12 in not in communication with network 16, device processing circuitry 28 repeats the determination of Block S102. In addition to repeating the determination of Block S102 or as an alternative to repeating the determination of Block S102, if device processing circuitry 28 determines that device 12 is not in communication with network 16 such that device 12 cannot transmit an activation request, described below, device 12 is configured to deactivate itself (w/communication interface 26 remaining active) or reduce its functionality.

If device processing circuitry 28 determines device 12 is connected to or is in communication with network 16, device processor circuitry 28 causes an activation request message to be transmitted to apparatus 14 (Block S104). The activation request message requests activation of device 12 functionality from apparatus 14. In one or more embodiments, the activation request message includes identification data 34 of device 12. For example, in one or more embodiments, identification data 34 includes at least one of a media access control (MAC) identifier of device 12, serial number associated with device 12, IP address, location data, domain name, service set identifier (SSID) and/or password used to connect to network 16 such as a Wi-Fi network, firmware version and other data associated with device 12. If device 12 is registered with apparatus 14, identification data 34 may additionally include at least one of user identification and password. In one or more embodiments, the location data is provided by a global positioning system (GPS) receiver of device 12.

Device processing circuitry 28 receives a response message from apparatus 14 (Block S106). For example, communication interface 26 receives a response message from apparatus 14 in response to the activation request message transmitted by device 12 to apparatus 14. The response message indicates whether activation of device 12 is authorized or not authorized. In one or more embodiments, the response message includes data or an indicator that indicates whether activation of device 12 is authorized or not authorized. Device processing circuitry 28 determines whether the response message indicates device 12 is authorized for activation (Block S108). In one or more embodiments, if a response message is not received within a predefined period of time, device processing circuitry 28 determines that activation of device 12 is authorized, i.e., a lack of a response from apparatus 14 indicates device 12 has not been reported stolen, lost, misplaced, etc., and is therefore authorized for activation.

If the determination is made that device 12 is authorized for activation, device processing circuitry 28 causes activation of device 12 (Block S110). In one or more embodiment, activation of device 12 includes activating remaining functions of device 12 that are not yet activated or activating a predefined number of functions of device 12. If the response message indicates activation of device 12 not authorized, device processing circuitry 28 causes device 12 to remain deactivated while communication interface 26 remains active, i.e., communication capability of device 12 remains active or predefined functionality of device 12 remains active (Block S112). In one or more embodiments, input and display functions are limited to entering network information for connecting to or logging onto network 16 when device 12 is deactivated. In one or more embodiments, a message appears on a display of device 12 indicating whether device 12 was activated. For example, if device 12 was not activated, device 12 displays a message indicating device 12 was not activated, e.g., "No Activation", thereby helping deter theft.

Figure 5:
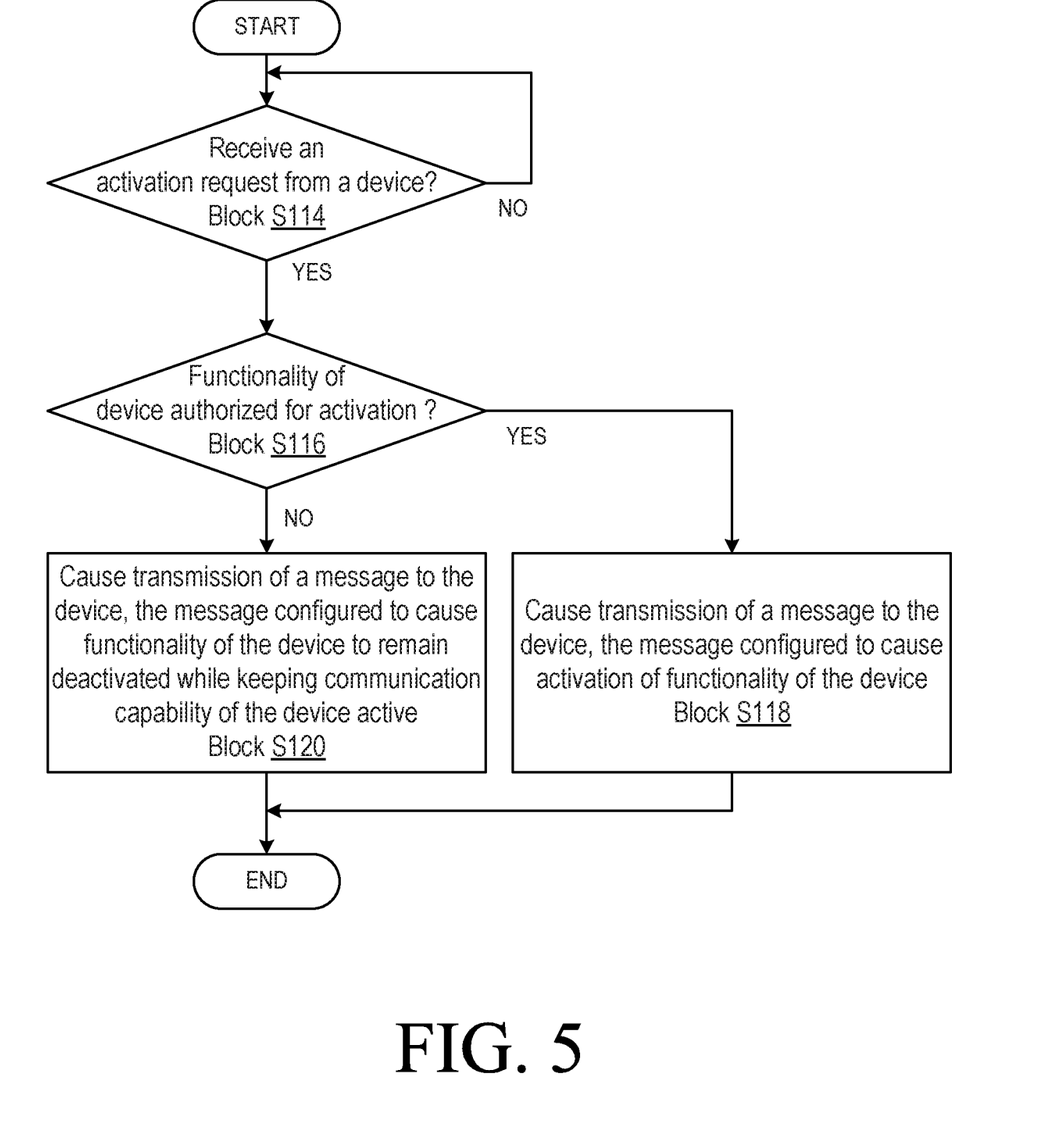
FIG. 5 is a flow diagram of an exemplary authorization process for managing activation and deactivation of functionality of the device in accordance with the principles of the invention.

FIG. 5 illustrates an exemplary authorization process for determining whether device 12 is authorized for activation in accordance with the principles of the invention. Apparatus processing circuitry 38 determines whether an activation request has been received from device 12 (Block S114). The data included in activation request message is discussed above with respect to Block S104. If apparatus processing circuitry 42 determines an activation request message has not been received, apparatus processing circuitry 38 repeats the determination of Block S114.

If apparatus processing circuitry 38 determines an activation request message has been received, apparatus processing circuitry 38 determines whether device 12 is authorized for activation based on the activation request message associated with device 12 (Block S116). In one or more embodiments, apparatus processing circuitry 38 compares data from activation request message with device data 25 stored in memory 42. In one or more embodiment, apparatus processing circuitry 38 compares data from activation request message with device data 25 stored at server 15. The comparison may include searching device data 25 for at least one of a MAC identifier of device 12 and serial number associated with device 12 that matches identification data 34 included in the activation request message. In general, the comparison includes comparing device data 25 to identification data 34 included in the activation request message for at least one data match. Matching device data 25 includes at least one indicator/flag that indicates whether activation of device 12 functionality is permitted or authorized. In one or more embodiments, a data match not being found in the comparison process indicates device 12 is authorized for activation such that device 12 has not been reported lost or stolen. In one or more embodiments, matching device data 25 may indicate that device 12 is authorized for activation of limited functions or for a predetermined period of time. For example, device data 25 may indicate one or more functions of device 12 are authorized for activation but that one or more other functions of device 12 are not allowed for activation.

If apparatus processing circuitry 38 determines device 12 is authorized for activation, apparatus processing circuitry 38 causes transmission of an activation message, to device 12, that is configured to cause activation of device 12 (Block S118). For example, the activation message transmitted to device 12 may include an indication that device 12 is authorized for activation. In one or more embodiment, the activation message includes an activation passcode or command for activating device 12. In one or more embodiments, the activation message is configured to cause device 12 to reinitiate the verification process discussed above at a predefined time at the end of a predefined time period or when at least one activation request rule is met. For example, the activation message may be configured to cause device 12 to re-verify that device 12 is still authorized for activation, thereby helping prevent the situation where a thief gets unlimited enjoyment of device 12 that was initially properly activated as described above, i.e., any use of an already activated device 12 by a thief will be temporary as device 12 will perform the verification process at a later time when device data 25 would have been updated as described in FIG. 6. If apparatus processing circuitry 38 determines device 12 is not authorized for activation, apparatus processing circuitry 38 causes transmission of a deactivation message, to device 12, that is configured to cause device 12 to remain deactivated while keeping communication capability of device 12 active (Block S120). In one or more embodiments apparatus processing circuitry 38 determines a location of device 12 based on location data included in the activation response message from device 12. In one or more embodiment, apparatus processing circuitry 38 causes one or more alert messages to be transmitted to one or more predefined entities in response to determining device 12 is not authorized for activation. For example, one or more alert messages may be transmitted to a first responder and/or owner of device 12. The alert message may include location data of device 12.

Figure 6:
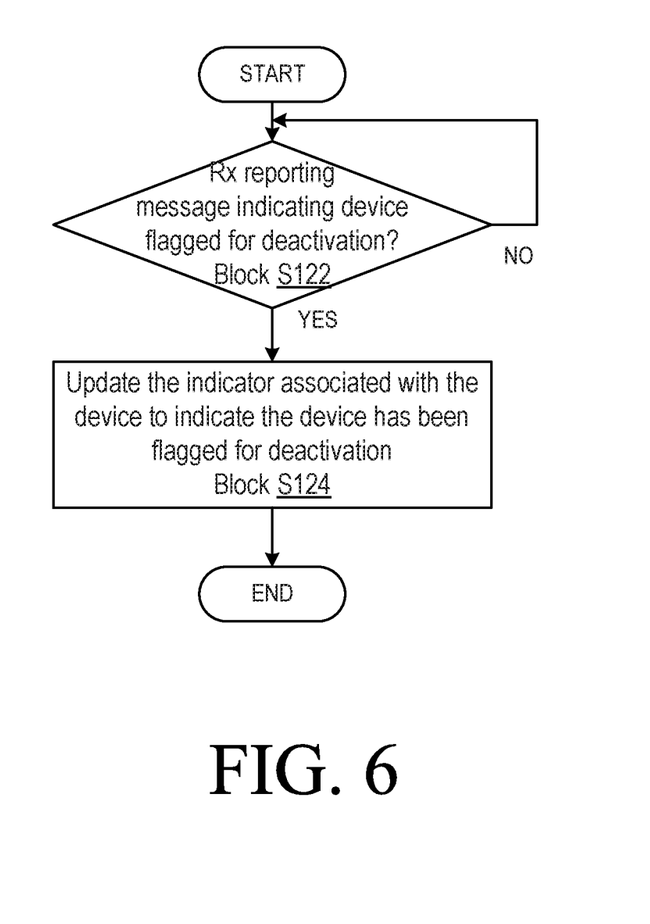
FIG. 6 is a flow diagram of an exemplary updating process for updating device data in accordance with the principles of the invention.

An exemplary updating process for updating device data 25 in accordance with the principles of the invention is described with respect to FIG. 6. In particular, the invention advantageously allows on-demand updating to device data 25 such that a user, manufacturer, business owner, distributor, insurance provider or other entity can report device 12 as stolen, lost, etc., thereby helping prevent enjoyment of unauthorized devices 12 by unauthorized users such as thieves. Apparatus processing circuitry 38 determines whether a reporting message indicating device 12 has been flagged for deactivation has been received (Block S122). For example, the reporting message may be associated with a user, manufacturer, business owner and/or other entity that lost device 12 or had device 12 stolen such that the entity wants device 12 to be deactivated if already activated or to remain deactivated. The reporting message includes identification data 34 as discussed above.

If apparatus processing circuitry 38 determines a reporting message has not been received, apparatus processing circuitry 38 repeats the determination of Block S122. If apparatus processing circuitry 38 determines a reporting message has been received, apparatus processing circuitry 38 updates the indicator associated with device 12 to indicate device 12 has been flagged for deactivation (Block S124). For example, apparatus processing circuitry 38 adds identification data 34 from the reporting message that corresponds to a specific device 12 to device data 25 corresponding to a specific device 12 in which the indicator is set to flag device 12 for deactivation. In another example, if device data 25 corresponding to identification data 34 from reporting message is already stored in memory 42, device data 25 is updated in which an indicator is updated to flag device 12 for deactivation. Additional identification information may be added to device data 25.

Therefore, the invention advantageously provides an apparatus, device and method for activating functionality of a deactivated device 12 that has predefined limited functionality when deactivated or keeping functionality of device 12 active. By limiting functionality of deactivated device 12 to communication based functionality for the purpose of authenticating device 12, device 12 is rendered substantially useless for its intended purpose, thereby deterring theft of device 12 since a thief knows there will be no enjoyment of deactivated device 12. Further, even after activation, device 12 can determine whether to request activation based on one or more activation request rules, thereby triggering verification of device 12 functionality.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing controller to produce a machine, such that the instructions, which execute via the processor of the computer or other programmable data processing controller, create means for implementing the functions/acts specified in the flowchart and/or block diagram block or blocks.

These computer program instructions may also be stored in a computer readable memory that can direct a computer or other programmable data processing controller to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing controller to cause a series of operational steps to be performed on the computer or other programmable controller to produce a computer implemented process such that the instructions which execute on the computer or other programmable controller provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. An apparatus locatable at a premises, the apparatus being configured to communicate with a plurality of premises devices and control activation and deactivation of functionality of a premises device of the plurality of premises devices, the apparatus comprising:
processing circuitry including a memory and a processor, the memory containing instructions that, when executed by the processor, configure the processor to, while the premises device is deactivated:
receive an activation request from the premises device, the activation request including identification data of the premises device;
determine whether functionality of the premises device is authorized for activation based on the identification data;
in response to determining the premises device is not authorized for activation, cause transmission of a message to the premises device, the message configured to cause functionality of the premises device to remain deactivated while keeping communication capability of the premises device activated for requesting activation;
in response to transmission of the message based on the determination that the premises device is not authorized for activation, receive a reply message from the premises device, the reply message indicating a location of the premises device and, if the premises device is not located on the premises, automatically provide a notification to a third party, the notification including the identification data and the location of the first premises device; and
in response to determining the premises device is authorized for activation, one of (a) cause transmission of a message to the premises device, the message configured to cause at least one more function of the premises device to activate while prohibiting activation of at least one other function and (b) prevent a transmission of a message to the premises device, the prevention indicating whether activation of functionality of the premises device is authorized.

2. The apparatus of claim 1, wherein the message configured to cause functionality of the premises device to remain deactivated further enables the premises device to power up and power down, display a plurality of predefined messages and transmit at least one message with a final destination address of the apparatus.

3. The apparatus of claim 1, the memory containing further instructions that, when executed by the processor, cause the processor to, while the premises device is deactivated, notify authority of the received activation request if functionality of the premises device is not authorized for activation.

4. The apparatus of claim 1, wherein the memory stores a plurality of identifiers and a plurality of indicators, each identifier corresponding to a respective premises device, each indicator indicating whether functionality of a respective premises device has been flagged for deactivation; and
the memory containing further instructions that, when executed by the processor, cause the processor to, while the premises device is activated:
receive a message indicating functionality of the premises device has been flagged for deactivation, the message indicating an identifier associated with the premises device;
in response to receiving the message indicating functionality of the premises device has been flagged for deactivation, update the indicator associated with the premises device to indicate functionality of the premises device has been flagged for deactivation; and
the determination that functionality of the premises device is not authorized for activation being based on the indicator associated with the premises device.

5. The apparatus of claim 1, wherein the memory stores further instructions that, when executed by the processor, configured the processor to, while the premises device is deactivated and in response to determining the premises device is not authorized for deactivation, determine a location of the premises device.

6. The apparatus of claim 5, wherein the determination of the location of the premises device includes at least one of determining the location based on a device location received from the premises device and determining the location based on an internet protocol address associated with the message received from the premises device.

7. The apparatus of claim 1, wherein the memory stores a plurality of identifiers and a plurality of indicators, each identifier corresponding to a respective premises device, each indicator indicating whether functionality of the premises device has been flagged for deactivation;
the determination whether functionality of a respective premises device is authorized for activation includes searching the plurality of identifiers stored in memory for an identifier corresponding to the identification data; and
if an identifier corresponding to the identification data is not found in memory, determining functionality of the respective premises device is authorized for activation.

8. The apparatus of claim 1, wherein the identification data includes at least one of a MAC identifier of the premises device and serial number associated with the premises device.

9. The apparatus of claim 7, wherein the plurality of identifiers are updatable by at least one of a consumer, manufacturer and vendor.

10. A method for communicating with a plurality of premises devices and controlling activation and deactivation of functionality of a premises device of the plurality of premises devices, the method comprising, while the premises device is deactivated:
receiving an activation request from the premises device, the activation request including identification data of the premises device;
determining whether functionality of the premises device is authorized for activation based on the identification data;
in response to determining the premises device is not authorized for activation, transmitting, to the premises device, a message configured to cause functionality of the premises device to remain deactivated while keeping communication capability of the premises device activated for requesting activation;
in response to transmission of the message based on the determination that the premises device is not authorized for activation, receive a reply message from the premises device, the reply message indicating a location of the premises device and, if the premises device is not located on the premises, automatically provide a notification to a third party, the notification including the identification data and the location of the premises device; and in response to determining the premises device is authorized for activation, one of (a) causing transmission of a message to the premises device, the message configured to cause at least one more function of the premises device to activate while prohibiting activation of at least one other function of the premises device and (b) preventing transmission of a message to the premises device, the prevention indicating whether activation of functionality of the premises device is authorized.

11. The method of claim 10, wherein the message configured to cause functionality of the premises device to remain deactivated further enables the premises device to power up and power down, display a plurality of predefined messages and transmit at least one message with a final destination address of the apparatus.

12. The method of claim 10, further comprising:
storing a plurality of identifiers and a plurality of indicators, each identifier corresponding to a respective premises device, each indicator indicating whether functionality of a respective premises device has been flagged for deactivation;
receiving, while the premises device is activated, a message indicating functionality of the premises device has been flagged for deactivation, the message indicating an identifier associated with the premises device;
in response to receiving the message indicating functionality of the premises device has been flagged for deactivation, updating, while the premises device is activated, the indicator associated with the premises device to indicate functionality of the premises device has been flagged for deactivation; and
the determination that functionality of the premises device is not authorized for activation being based on the indicator associated with the premises device.

13. The method of claim 10, further comprising, while the premises device is deactivated, in response to determining functionality of the premises device is not authorized for deactivation, determining a location of the premises device.

14. The method of claim 10, further comprising notifying, while the premises device is deactivated, authority of the received activation request if functionality of the premises device is not authorized for activation.

15. The method of claim 10, wherein the determination of the location of the premises device includes at least one of determining the location based on a device location received from the premises device and determining the location based on an internet protocol address associated with the message received from the premises device.

16. The method of claim 10, further comprising storing a plurality of identifiers and a plurality of indicators, each identifier corresponding to a respective premises device, each indicator indicating whether functionality of the respective premises device has been flagged for deactivation;
the determination whether functionality of a respective premises device is authorized for activation includes searching the plurality of identifiers stored in memory for an identifier corresponding to the identification data; and
if an identifier corresponding to the identification data is not found in memory, determining functionality of the respective premises device is authorized for activation.

17. The method of claim 10 wherein the identification data includes at least one of a MAC identifier of the premises device and serial number associated with the premises device.

18. The method of claim 16, wherein the plurality of identifiers are updatable by at least one of a consumer, manufacturer and vendor.

19. An apparatus locatable at a premises, the apparatus being configured to communicate with a plurality of premises devices and control activation and deactivation of functionality of a premises device of the plurality of premises devices, the apparatus comprising:
processing circuitry including:
a processor; and
a memory, the memory configured to store a plurality of identifiers and a plurality of indicators, each identifier corresponding to a respective premises device, each indicator indicating whether functionality of a respective premises device has been flagged for deactivation; and the memory containing instructions that, when executed by the processor, configure the processor to, while the respective premises device is deactivated:
receive an activation request from the premises device, the activation request including identification data of the premises device;
determine whether functionality of the premises device is authorized for activation based on the indicator associated with the identification data;
in response to determining functionality of the premises device is not authorized for activation, cause:
transmission of a first message to the premises device, the first message configured to cause functionality of the device to remain deactivated while keeping communication capability of the premises device activated for requesting activation;
in response to transmission of the message based on the determination that the premises device is not authorized for activation, receive a reply message from the premises device, the reply message indicating a location of the premises device and, if the premises device is not located on the premises, automatically provide a notification to a third party, the notification including the identification data and the location of the premises device; and
in response to determining functionality of the premises device is authorized for activation, one of (a) cause transmission of a second message to the premises device, the second message configured to cause activation of at least one more function of the premises device while prohibiting activation of at least one other function of the premises device and (b) prevent a transmission of the second message to the premises device, the prevention indicating whether activation of functionality of the premises device is authorized;
the memory containing further instructions that, when executed by the processor, configure the processor to, while the premises device is activated:
receive a message indicating functionality of the premises device has been flagged for deactivation, the message indicating an identifier associated with the premises device; and
in response to receiving the message indicating functionality of the premises device has been flagged for deactivation, update the indicator associated with the premises device to indicate functionality of the premises device has been flagged for deactivation.

* * * * *